(12) United States Patent
Culver et al.

(10) Patent No.: US 8,343,642 B2
(45) Date of Patent: Jan. 1, 2013

(54) HIGH VOLTAGE MODULAR BATTERY WITH COMPRESSION BLADDER

(75) Inventors: Duncan Culver, Howell, NJ (US); Christopher K. Dyer, Madison, NJ (US); Michael L. Epstein, Bedminster, NJ (US)

(73) Assignee: Lightening Energy, Dover, NJ (US)

( * ) Notice: Subject to any disclaimer, the term of this patent is extended or adjusted under 35 U.S.C. 154(b) by 381 days.

(21) Appl. No.: 12/650,859

(22) Filed: Dec. 31, 2009

(65) Prior Publication Data

US 2011/0159352 A1 Jun. 30, 2011

(51) Int. Cl.
*H01M 2/24* (2006.01)
*H01M 2/26* (2006.01)

(52) U.S. Cl. ............ 429/66; 429/160; 429/208
(58) Field of Classification Search .......... 429/66, 429/122–347
See application file for complete search history.

(56) References Cited

U.S. PATENT DOCUMENTS

| | | | |
|---|---|---|---|
| 3,056,850 A | 10/1962 | Rauske | |
| 3,844,841 A | 10/1974 | Baker | |
| 4,189,528 A * | 2/1980 | Klootwyk | 429/70 |
| 4,957,829 A | 9/1990 | Holl | |
| 5,256,502 A | 10/1993 | Kump | |
| 5,346,786 A | 9/1994 | Hodgetts | |
| 5,393,617 A | 2/1995 | Klein | |
| 5,429,643 A | 7/1995 | Lund et al. | |
| 5,552,243 A | 9/1996 | Klein | |
| 5,595,839 A | 1/1997 | Hossain | |
| 6,040,085 A | 3/2000 | Cheu et al. | 429/185 |
| 6,492,053 B1 | 12/2002 | Donelson et al. | |
| 6,517,967 B1 | 2/2003 | Shrim et al. | |
| 6,887,620 B2 | 5/2005 | Klein et al. | |
| 7,163,761 B2 | 1/2007 | Debe et al. | |
| 7,462,416 B2 | 12/2008 | Kim | |
| 2001/0049054 A1 | 12/2001 | Ecomoto et al. | |
| 2002/0136946 A1 | 9/2002 | Amatucci et al. | |
| 2003/0013009 A1 | 1/2003 | Dansui et al. | |
| 2003/0013015 A1 | 1/2003 | Klein et al. | 429/210 |
| 2003/0194605 A1 | 10/2003 | Fauteux et al. | 429/149 |
| 2004/0038123 A1 | 2/2004 | Hisamitsu et al. | |
| 2005/0084754 A1 * | 4/2005 | Klein | 429/210 |
| 2005/0089751 A1 | 4/2005 | Oogami et al. | |
| 2005/0214638 A1 | 9/2005 | Asahina et al. | |
| 2006/0057433 A1 | 3/2006 | Ando et al. | |
| 2006/0121342 A1 | 6/2006 | Sano et al. | |
| 2006/0188776 A1 | 8/2006 | Aker et al. | |
| 2006/0203429 A1 | 9/2006 | Thrap et al. | 361/502 |
| 2007/0015047 A1 | 1/2007 | Hosaka et al. | |
| 2007/0026739 A1 | 2/2007 | Kim et al. | |
| 2007/0128472 A1 | 6/2007 | Tierney | |
| 2007/0158574 A1 | 7/2007 | Petrillo et al. | |
| 2008/0070102 A1 | 3/2008 | Watanabe | |

(Continued)

OTHER PUBLICATIONS

International Search Report from PCT/US2009/001791 (corresponds to US 2009/0239130 A1).

(Continued)

*Primary Examiner* — Basia Ridley
*Assistant Examiner* — Jonathan G Leong
(74) *Attorney, Agent, or Firm* — Davidson, Davidson & Kappel, LLC

(57) ABSTRACT

A modular battery includes a housing, a first battery cell having a first electrode surface, a second battery cell having a second electrode surface, and a pressurizable bladder forcing the first battery cell against the second battery cell.

9 Claims, 2 Drawing Sheets

U.S. PATENT DOCUMENTS

| | | |
|---|---|---|
| 2008/0070106 A1 | 3/2008 | Hock et al. |
| 2008/0266752 A1 | 10/2008 | Thrap et al. |
| 2009/0239130 A1 | 9/2009 | Culver et al. |
| 2009/0305125 A1 | 12/2009 | Kosugi et al. |
| 2010/0104927 A1 | 4/2010 | Albright |
| 2010/0167116 A1 | 7/2010 | Okada |
| 2010/0273044 A1 | 10/2010 | Culver et al. |
| 2011/0159351 A1 | 6/2011 | Culver et al. |
| 2011/0177383 A1 | 7/2011 | Culver et al. |
| 2011/0200867 A1 | 8/2011 | Culver et al. |

OTHER PUBLICATIONS

International Search Report from PCT/US2010/001248 (corresponds to US 2010/0273044 A1).
International Search Report from PCT/US2010/003154 (corresponds to US 2011/0159351 A1).
International Search Report from PCT/US2011/000077 (corresponds to US 2011/0177383 A1).
International Search Report from PCT/US2011/000276 (corresponds to US 2011/0200867 A1).

* cited by examiner

HIGH VOLTAGE MODULAR BATTERY WITH COMPRESSION BLADDER

BACKGROUND

Modular batteries are batteries which comprise two or more battery cells or cell modules or cells. A common example of a device using a modular battery is a hand held flashlight which may use for example two C cells.

Recently, modular batteries have become important in many applications, including hybrid electric vehicles ("HEV"), plug-in hybrid electric vehicles ("PHEV"), and other applications. When used in HEV, PHEV, and other applications, in addition to being durable, safe and cost effective, modular batteries are required to deliver a great deal of power.

Applications of modular batteries, like the hand-held flashlight, require the use of multiple battery cells connected in series. However, the modular batteries for HEVs and PHEVs, for example, may differ from the modular C cells used in a common flashlight.

U.S. Patent Publication No. 2009-0239130 A1 discloses a modular battery with interconnectors, and is hereby incorporated by reference herein.

SUMMARY OF THE INVENTION

The present invention provides a modular battery comprising a housing, a first battery cell having a first electrode surface, a second battery cell having a second electrode surface, and a pressurizable bladder forcing the first battery cell against the second battery cell.

The present invention also provides a method for forming a modular battery comprising: placing a first battery cell having a first electrode surface in a housing, placing a second battery cell having a second electrode surface in the housing, placing a bladder over the second battery cell, and pressurizing the bladder to force the second battery cell against the first battery cell.

The present invention also provides a method for operating a modular battery comprising: inflating a bladder to a predetermined pressure, the bladder forcing a first battery cell against a second battery cell; and monitoring the bladder pressure during operation of the modular battery.

BRIEF DESCRIPTION OF THE DRAWINGS

The present invention will be described with respect to a preferred embodiment, in which.

The drawings are schematic in nature and not to scale. For clarity and ease of understanding, some elements have been exaggerated in size.

DETAILED DESCRIPTION

In order to be powerful enough for HEVs, PHEVs, and other applications, it is desirable to use modular batteries containing cells with a high surface to volume ratio, for example using a planar design for each cell of the battery. These cells may be, for example, about the size of a large book wherein the "front" of the book contains, for example, a positive terminal (also known as an electrode) and the "back" of the book contains, for example, a negative terminal. Unlike their cylindrical counterparts (e.g., C cell batteries) which use a raised dimple at one end of a cell to make electrical contact with the next cylindrical cell, substantially planar cells need not have such raised dimple(s).

For many applications requiring high electrical power including HEVs and PHEVs, it is desirable that the battery delivers electrical power at a high voltage in order to reduce the required current needed to supply the electrical power which in turn will beneficially reduce the need for high-current carrying materials to the devices using the electrical power. Electrical power is the multiple of voltage and current and high voltage delivery of electrical power to a device, for example an electric motor, will require thinner or less conductive current carriers (for example copper wire) to the device which will reduce their cost. Electric vehicles for example may require a battery to provide electrical power at 300 to 600 volts. This high voltage is typically achieved by externally connecting multiple lower voltage battery modules electrically in series. This is in part due to safety considerations in assembling and operating a series connected "stack" of typical "pouch" cells within a battery module, since at higher voltages and especially above approximately 60 Volts, there is a significant risk of electrical arcing and a severe shock hazard since the edge peripheries of "flat" cells such as typical "pouch" cells have their cell terminals exposed. For safety these cell terminals are connected electrically in series within a low voltage battery module, for example, having less than 60 volts.

An object of the present invention is to provide sufficient pressure to ensure that battery modules retain good electrical contact. Another alternate or additional object is to provide and/or use information on the pressure within the modular battery.

The present invention may be used with the modular battery disclosed in incorporated-by-reference U.S. Patent Publication No. 2009-0239130 A1.

Figure 1:
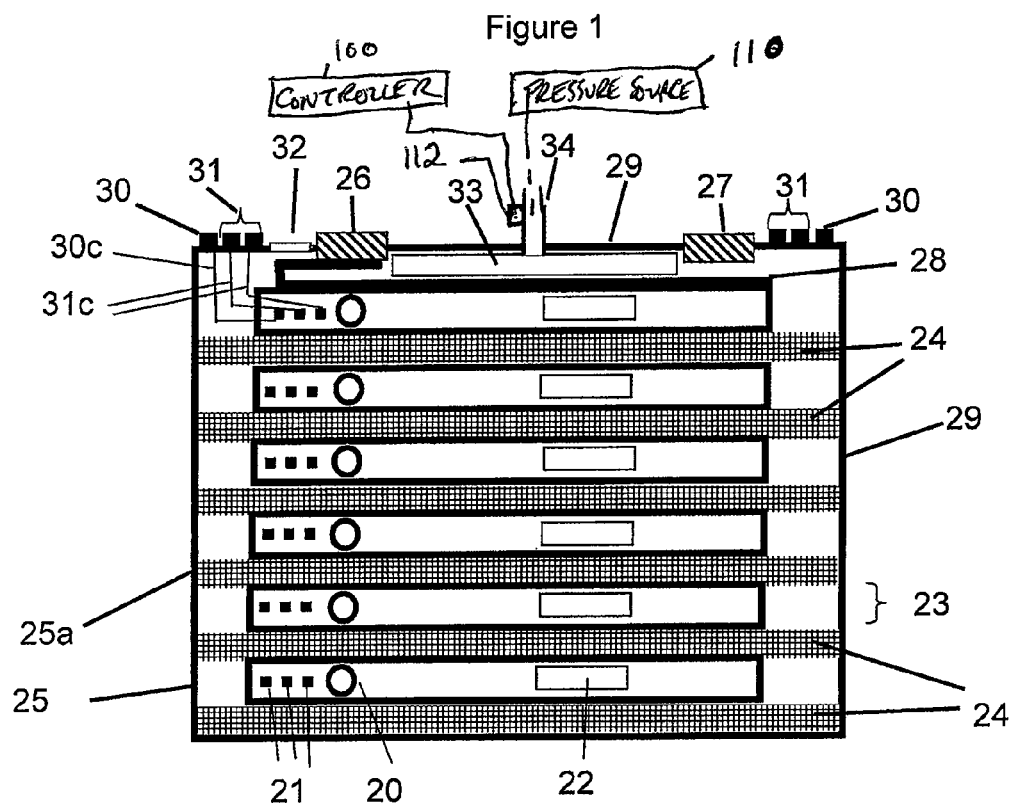
FIG. 1 schematically illustrates a cross-section of an embodiment of the present invention with a modular battery having six cell modules within an enclosure with feedthroughs.

FIG. 1 shows six cell modules 23 stacked one on another electrically in series and separated by the compressible interconnectors 24 which serve to electrically connect in series one cell module to the next cell module. Details of the cell modules are found in U.S. Patent Publication No. 2009-0239130 A1, although it is noted that other modules may be used in accordance with the present invention. Several interconnectors 24 can be present between two cell modules, for example 8 layers, each 10 mils in thickness. Thus the space between cell modules for example can be 80 mils, and compressible to 60 mils when in use.

For the lowest electrical resistance between cell modules 23 in the battery stack, pressure should be applied to the interconnectors 24 between the cell modules 23. For other modular batteries pressure between the modules also may be important, even if no interconnectors are present. The modules 23 and interconnectors 24 are placed one after another in an enclosure 25, which may have an interior electrically insulating material 25a. Each module 23 may have a port 20 for an electrolyte, electrical feedthroughs 21 and burst disc 22 for pressure relief in the module 23.

Figure 2:
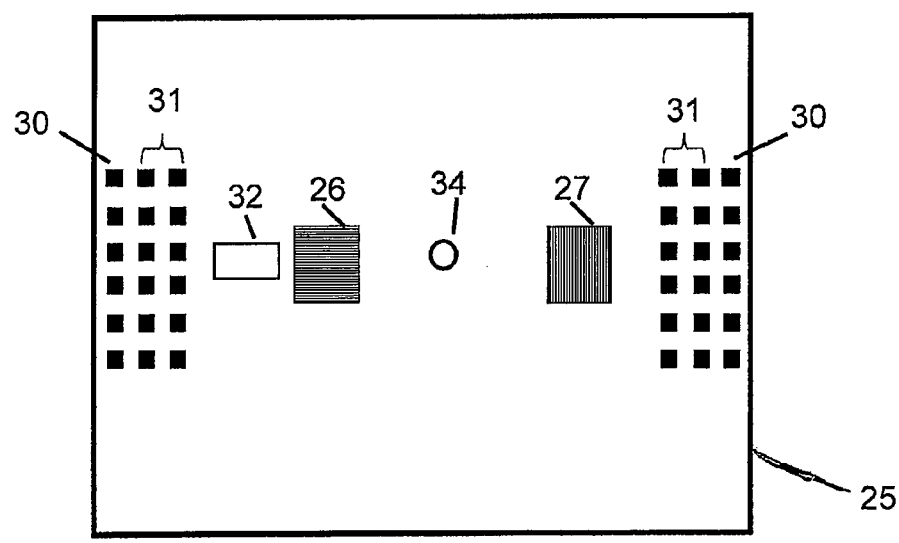
FIG. 2 shows a plan view of the FIG. 1 embodiment.

Multipin connectors 30, 31 can be provided for each of the cell modules 23, as shown for example in FIG. 2. These can be connected to the individual cell modules 23 via sense lines 30c, 31c and as described in incorporated-by-reference U.S. Patent Publication No. 2009-0239130 A1.

A positive electrical bus 28 can be placed over the last cell module 23 in the enclosure, and connected to a positive power terminal 26. A negative power terminal 27 can be connected via the electrically-conductive enclosure 25 to the bottom interconnector 24, the enclosure 25 thus functioning as a negative bus 29.

A burst disc 32 can be included in the enclosure 25, to provide relief if pressure within enclosure 25 becomes too great.

More than 50 cell modules may be placed in the enclosure 25, and preferably at least 20.

As shown in FIG. 1, the present invention provides an expandable bladder 33, with a gas port 34 to allow gas entry. The bladder is sealed into the top of the enclosure 25 such that the bladder 33 is positioned between the positive electrical bus 28 and the top of the enclosure 25 and is pressurized by applying gas pressure through the gas port 34. The expansion of the bladder 33 upon pressurizing the bladder with a suitable gas transmits pressure to the interconnectors 24 within the stack of cell modules 23.

The gas may be air, or an inert gas, for example.

By pressurizing to a predetermined level via for example a detachable pressure source 110 such as a compressor, and then sealing the gas port 34, consistent pressures can be applied from one battery to another during manufacturing. The actual pressure will depend on characteristics of the battery itself, and the desired pressure between the modules 23, but pressures of up to 2 atmospheres or more may be used.

The bladder 33 may be made for example of rubber or other expandable material, and may include a strengthened area at its outer periphery, for example made of metal, so that the bladder expands mainly in the direction of the stack of modules.

A planar surface of the bottom of the bladder 33 preferably is at least 50% as large as a planar surface of the battery module 23, and the planar surfaces of both the bladder and the modules 23 preferably are axially aligned so that the pressure from the bladder 33 is even about a planar center of the battery modules, or the axial center of the enclosure 25. Port 34 preferably is also coaxial with the axial center of the enclosure 25.

The present invention also provides a pressure sensor 112 for the bladder 33, the sensor 112 continuously monitoring the pressure in the bladder 33 even after port 34 is sealed. Signals from the pressure sensor 112 can be sent to a controller 100, for example a microprocessor or ASIC. Controller 100 and sensor 112 may be powered by their own power source, such as a separate battery, or by the battery module.

By continuously monitoring the pressure in the bladder 33 during service, additional battery safety information can be logged on a continuing basis as part of the overall battery communications and control system, of which controller 100 is part. Although a burst disc 32 is included in the enclosure 25, upward trends in battery internal pressure could be an early indicator of catastrophic failure, possibly independent of voltage and temperature trends. For instance, undesirable gas generation within the cell modules 23 gradually increases back pressure on the bladder as the gas accumulates and provides an early warning which temperature and voltage monitoring may not provide since neither are a cumulative measure but are instantaneous measurements.

Figure 3:
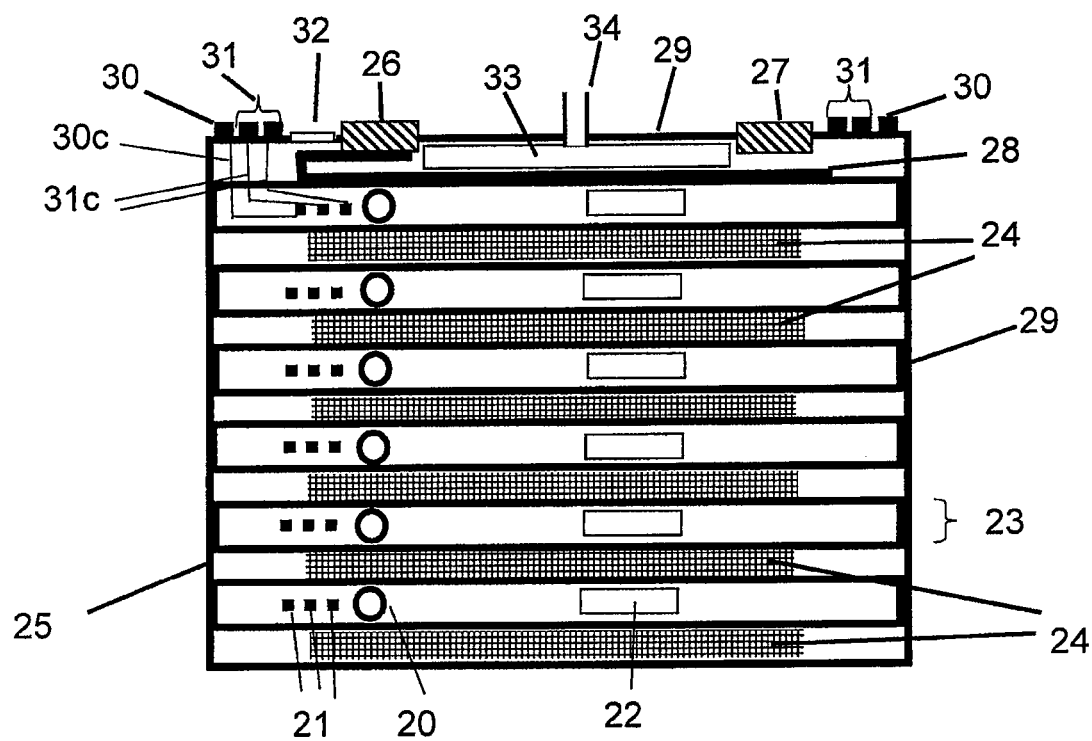
FIG. 3 shows an alternate embodiment of the present invention.

The controller 100 thus can be given one or more setpoint pressure values, and take action as the setpoint values are reached. For example, there can be a filling setpoint value which, when reached during pressurization by pressure source 110 can automatically activate a valve to seal port 34, or indicate to operating personnel that port 34 could be sealed. A further setpoint value could be an error pressure, so that is a pressure in the bladder 33 falls below the error pressure, a warning is provided. Since pressure may vary during operation the battery, for example, in a vehicle due to road conditions, the controller 100 could also issue the warning solely if the pressure falls below the error pressure for a certain period of time. Other data, such as the rate of fall of the pressure with respect to time, dP/dt, or the acceleration of the pressure drop could be measured as well, and depending on the battery use, used to indicate an error or other warnings. The sensors or controller also could be operated in conjunction with other battery management systems or integrated with a central vehicle control system, FIG. 3 shows an alternate embodiment of the battery of the present invention in which the interconnectors 24 do not touch the sides of the enclosure 25, but the electrically-insulating sides of the modules 23 do.

It will be appreciated by those ordinarily skilled in the art that obvious variations and changes can be made to the examples and embodiments described in the foregoing description without departing from the broad inventive concept thereof. It is understood, therefore, that this disclosure is not limited to the particular examples and embodiments disclosed, but is intended to cover all obvious modifications thereof which are within the scope and the spirit of the disclosure as defined by the appended claims.

What is claimed is:

1. A modular battery comprising: a housing; a first battery cell having a first electrode surface; a second battery cell having a second electrode surface; a pressurizable bladder forcing the first battery cell against the second battery cell; a pressure sensor monitoring a pressure in the bladder; a controller connected to the pressure sensor; and a compressible interconnector between the first and second battery cells; wherein: the bladder is pressurized such that the bladder transmits pressure to the interconnector and compresses the interconnector; wherein: the controller includes a microprocessor or ASIC, wherein: the controller is programmed with one or more setpoint pressure values and the controller is programmed to take action as the one or more setpoint pressure values are reached.

2. The modular battery as recited in claim 1 wherein the first battery cell has a first planar surface, the bladder providing pressure to the first planar surface.

3. The modular battery as recited in claim 2 wherein the pressure is provided via an internal power bus electrically connected to the first planar surface and to a contact on the housing.

4. The modular battery as recited in claim 2 wherein the bladder pressure is centered on a planar center of the first planar surface. comprising a controller connected to the pressure sensor.

5. The modular battery as recited in claim 1 wherein the bladder is pressurized with air.

6. The modular battery as recited in claim 1 wherein the compressible interconnector electrically connects the first battery cell and the second battery cell.

7. The modular battery as recited in claim 1 wherein the one or more setpoint pressure values include a filling setpoint value; wherein the controller, when the filling setpoint value is reached, is programmed to cause a valve to seal a port of the bladder or to indicate to operating personnel to seal the port.

8. The modular battery as recited in claim 1 wherein the one or more setpoint pressure values includes at least one of: a rate of fall of the pressure in the bladder with respect to time or an acceleration of the pressure drop.

9. A modular battery comprising: a housing; a first battery cell having a first electrode surface; a second battery cell having a second electrode surface; a pressurizable bladder forcing the first battery cell against the second battery cell; a pressure sensor monitoring a pressure in the bladder; and a controller coupled to the pressure sensor, the controller includes a microprocessor or ASIC, wherein: the controller is programmed with one or more setpoint pressure values and the controller is programmed to take action as the one or more setpoint pressure values are reached.

* * * * *